United States Patent [19]

Rhodes

[11] 3,868,680

[45] Feb. 25, 1975

[54] ANALOG-TO-DIGITAL CONVERTER APPARATUS

[75] Inventor: Melvin H. Rhodes, Cedar Rapids, Iowa

[73] Assignee: Rockwell International Corporation, Dallas, Tex.

[22] Filed: Feb. 4, 1974

[21] Appl. No.: 439,185

[52] U.S. Cl. .......................... 340/347 SY, 235/186

[51] Int. Cl. .......................................... H03k 13/02

[58] Field of Search ....... 340/347 SY; 235/186, 189

[56] References Cited

UNITED STATES PATENTS

| | | | |
|---|---|---|---|
| 3,564,536 | 2/1971 | Hyatt | 340/347 SY |
| 3,564,539 | 2/1971 | Dew | 340/347 SY |
| 3,641,565 | 2/1972 | Ivers et al. | 340/347 SY |

OTHER PUBLICATIONS

Volder "Ire Transactions on Electronic Computers" Vol. EC8, No. 3, Sept. 1959, pp. 330–334.

*Primary Examiner*—Charles D. Miller
*Attorney, Agent, or Firm*—Bruce C. Lutz

[57] ABSTRACT

The method of and apparatus for converting from an analog vector output signal to a digital output indicative of not only the angle represented by the analog input vectors with respect to a reference but also the digital outputs indicative of sine angle and cosine of the angle. A CORDIC (Coordinate Rotation Digital Computer) type digital resolver is used in conjunction with a Scott T connection and a synchro to compare an initially approximately sine and cosine output with sine and cosine inputs as obtained from the Scott T connection whereby the comparison is utilized to make new output approximations in the digital resolver.

4 Claims, 7 Drawing Figures

| N | INPUT | Δθ | REG 66 | ΔREG 74 | REG 74 | ΔREG 84 | REG 84 |
|---|---|---|---|---|---|---|---|
| 0 | | 19888 | | | 00000 | | 19888 |
| 1 | + | 16384 | 16384 | +19888 | 19888 | −19888 | 00000 |
| 2 | − | 8192 | 8192 | − 0000 | 19888 | +19888 | 19888 |
| 3 | − | 4840 | 3352 | − 9444 | 9944 | + 9944 | 29832 |
| 4 | + | 2552 | 5904 | + 7458 | 17402 | − 2486 | 27346 |
| 5 | + | 1296 | 7200 | + 3418 | 20820 | − 2175 | 25171 |
| 6 | − | 648 | 6552 | − 1573 | 19247 | + 1301 | 26472 |
| 7 | − | 328 | 6224 | − 827 | 18420 | + 601 | 27073 |
| 8 | − | 160 | 6064 | − 423 | 17997 | + 288 | 27361 |
| 9 | − | 80 | 5984 | − 214 | 17783 | + 141 | 27502 |
| 10 | + | 40 | 6024 | + 107 | 17890 | − 69 | 27433 |
| 11 | − | 16 | 6008 | − 54 | 17836 | + 35 | 27468 |
| 12 | − | 8 | 6000 | − 27 | 17809 | + 17 | 27485 |

ANALOG-TO-DIGITAL CONVERTER APPARATUS

THE INVENTION

The present invention is generally directed toward electronics and more specifically towards converting analog synchro outputs, analog resolver outputs or two or more voltage vectors that can be resolved into analog sine and cosine voltage values, to digital output signals wherein the digital output trigonometric signals are directly representative of functions of the angle described by the input analog signals and are independent of their absolute values.

While there are many types of synchro converters and some of these provide a digital output indicative of the angle, it is believed that the present system is unique not only in using a CORDIC-type resolver but in providing digital outputs indicative of the sine and cosine of the angle as well as a digital output indicative of the angle itself. Even more unique is the fact that the digital sine and cosine do not vary in numerical value when both of the analog sine and cosine vector values vary proportionately.

The CORDIC trigonometric computing technique was described in the *IRE Transactions on Electronic Computers* in September, 1959 by Jack E. Volder. This IRE article outlines the basic concepts utilized in the CORDIC resolver of the present invention. This resolver utilizes positive or negative inputs for each successive word in a frame of words. These positive and negative inputs are utilized to control the sign of a number to be added to the sine and cosine registers, respectively. This number to be added is taken from the cofunction register and divided by a number indicative of the word time in the frame. Thus, the sine register receives inputs from the cosine register and three inputs are decreased on each successive occasion and are added or subtracted in accordance with the inputs to the resolver until at the end of the frame an output is obtained indicative of the angle being sought. The digital sine and cosine outputs are multiplied times the cosine and sine, respectively, received in analog form. The sine/cos multiplications are then compared to see which is bigger and the comparison produces the pulse or minus input to the resolver. Thus, the digital sine and cosine signals are utilized as feedback lines to continuously adjust the output until it is within the design tolerance of the system for accuracy as compared to the analog inputs.

It is thus an object of the present invention to provide an improved analog input signal to digital output signal converter.

Other objects and advantages of the present invention may be ascertained from a reading of the specification and appended claims wherein:

Figure 1:
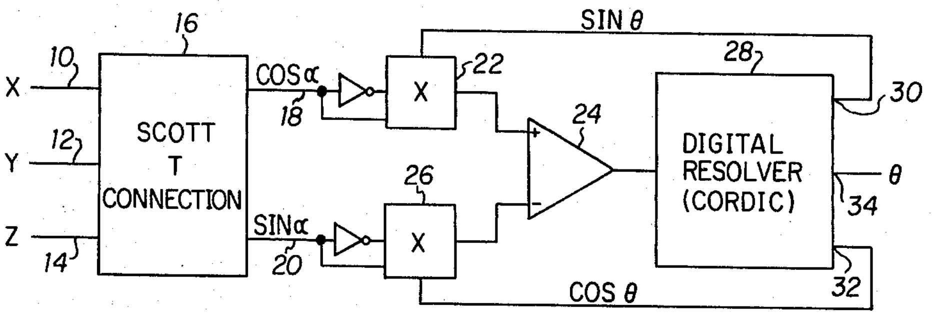
FIG. 1 is a block schematic diagram of the overall inventive concept.
Figure 4A:
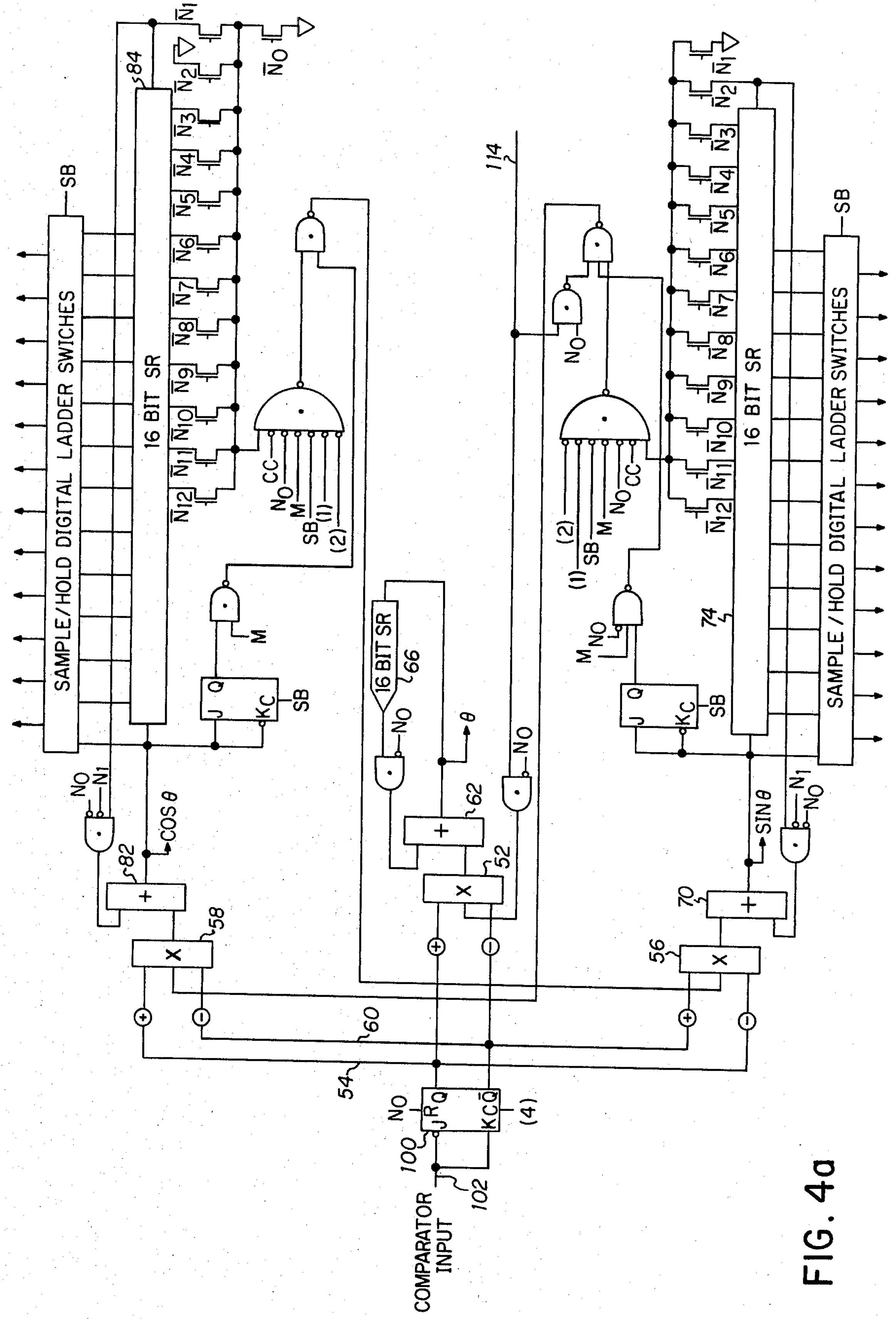
Figures 4B, 5:
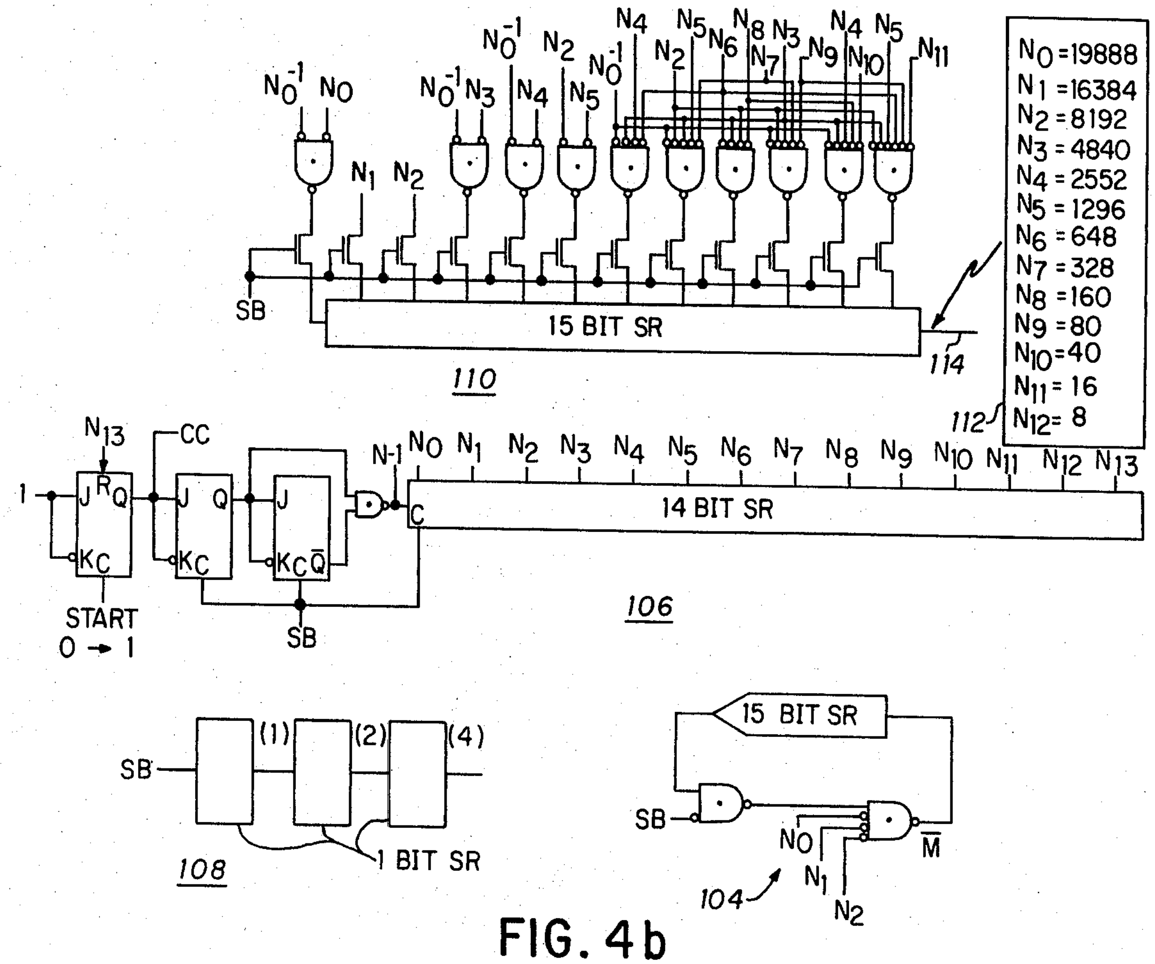

FIGS. 4*a* and 4*b* are detailed block diagrams of a preferred embodiment of the resolver of FIG. 1;

FIG. 5 is a chart for use in explaining the operation of the resolver, and

Figure 6:
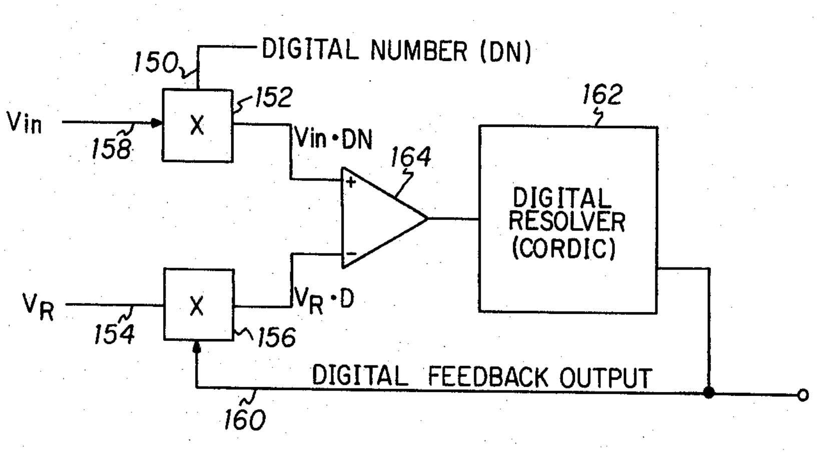

FIG. 6 is a block diagram of an analog to digital signal converter.

In FIG. 1 three leads, 10, 12 and 14 supply analog signals from a synchro resolver to a Scott T connection shown as block 16. The Scott T connection is well known in the art and may be of the type shown in a book entitled *Electrical Engineering* by Dawes, published by McGraw Hill, fourth ed., p. 294. The output of block 16 is illustrated on two leads 18 and 20. The lead 18 provides the cosine of alpha ($\alpha$) and is connected directly to a multiplying block 22 and is also inverted and connected as a further input in multiplying block 22. This multiplying block is a four quadrant multiplier and may be of the type shown in Section 2, p. 28–38 in a book entitled *Analog-to-Digital Handbook* by the Electrical Engineering Staff of Analog Devices, Incorporated, published by Analog Devices of Norword, Mass. 02062, in 1972. Lead 20 represents the sine of alpha and is connected directly to a multiplier 26 and through an inverter to a second input of multiplier 26. Again, multiplier 26 is a four quadrant multiplier constructed in the same fashion as multiplier 22. The output of multipliers 22 and 26 are connected respectively to positive and negative inputs of a comparator or differential amplifier 24 the output of which is connected to the input of a digital resolver 28. The resolver 28 has a first output 30 providing a digital indication of data which is connected to a further input of multiplier 22 and has a second output 32 providing cos theta ($\theta$) to a further input of multiplier 26. Finally, resolver 28 has an output 34 which provides a digital indication of an angle theta. This resolver 28 is of the CORDIC type referenced previously and it is this CORDIC resolution which provides the unique features of the present invention. In other words, the ability to provide digital outputs indicative of sine and cos of the angle with these outputs remaining at given digital values in spite of variations in the amplitude of sine alpha and cos alpha as long as these two values are in the same proportion one with respect to the other and in other words are representing the same angle.

It should be noted that the present concept can operate either with a DC value providing the inputs on lines 18 and 20, or if the inputs are AC there must be a timing sequence operating the switches within multipliers 22 and 26 such that the same half-cycle is always sampled rather than occasionally sampling a positive half-cycle and then later sampling a negative half-cycle. As will be realized, the inventive concept will operate on either negative half-cycles or positive half-cycles and it is merely a requirement that the sampling be consistent.

Figure 2:
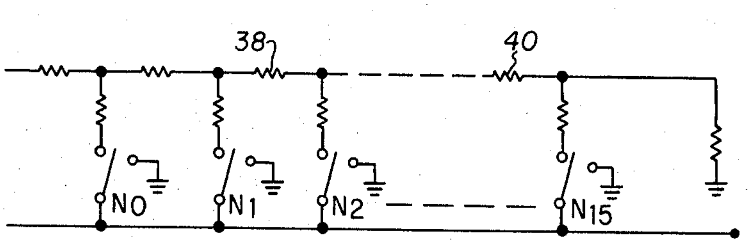
FIG. 2 is a schematic diagram of a ladder multiplying network as used in FIG. 1.

In FIG. 2 a plurality of resistors is illustrated in a more or less well-known ladder-type network. A dash line is illustrated between resistors 38 and 40 to signify that there are several more stages of the ladder not shown. A plurality of switches $N_0$ through $N_{15}$ are illustrated with the further indication that there are a plurality of switches omitted. Each of these switches is operated by the appearance in the input on either lead 30 or 32 of a logic 1 bit in the corresponding position in the word signifying the sin/cos function of theta at that word time in the frame. Thus, a logic 1 in the second bit position would close the switch $N_1$.

Figure 3:
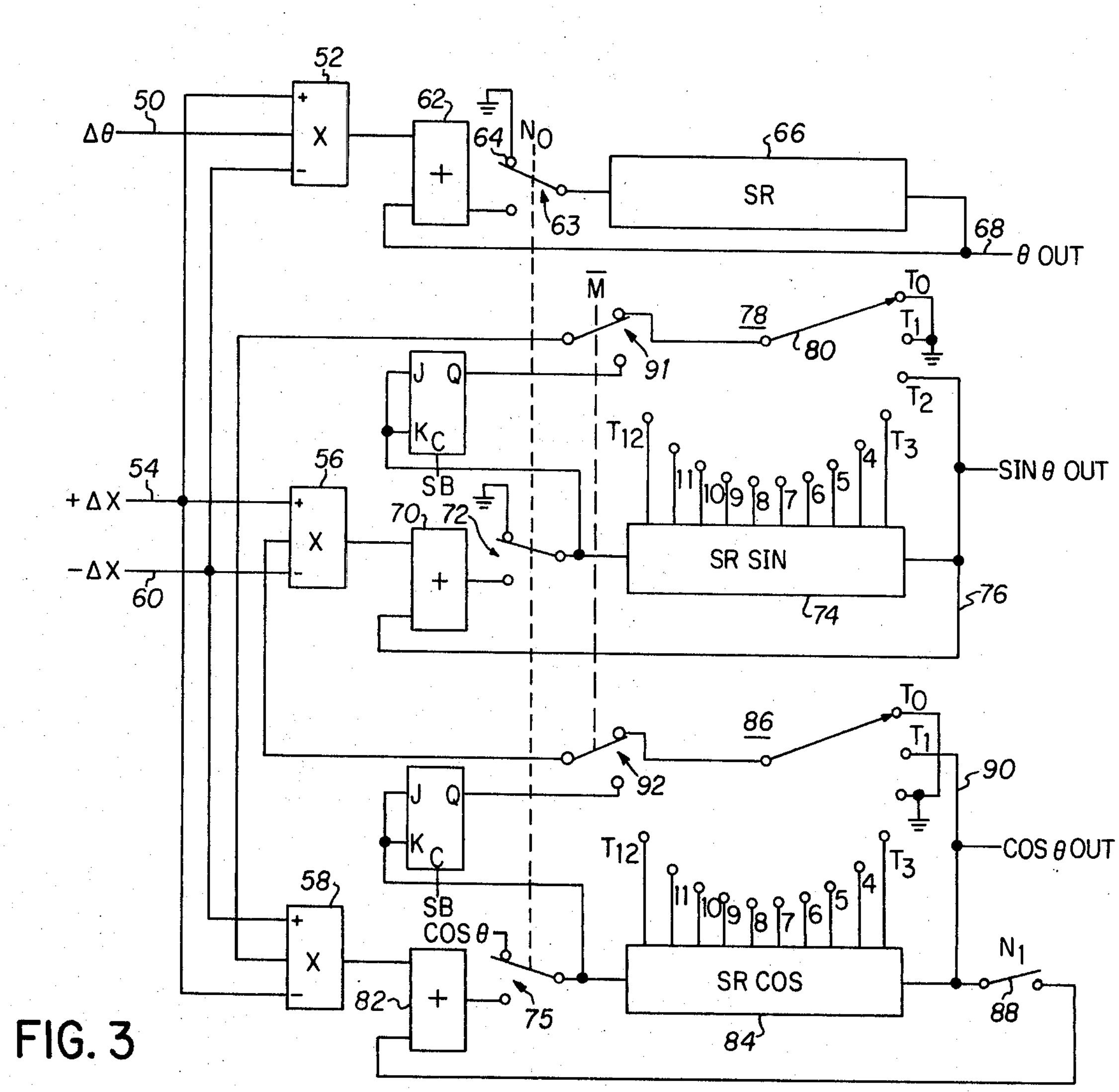
FIG. 3 is a simplified block diagram of the digital resolver used in FIG. 1.

In FIG. 3, a delta ($\Delta$) theta input 50 is illustrated as being supplied to a multiplying input of a block 52. This block 52 and other multiplying and summing blocks appearing in later figures of this application are described in more detail in a U.S. Pat. No. 3,757,261 in the name of Delaine C. Sather and assigned to the assignee of the present invention. Thus, further details will not be supplied other than to state that the output of block 52 is positive if the plus input terminal of the multiplier is actuated and negative if the minus input terminal is actuated at the time that a word is being passed through the multiplier block. A plus delta X lead 54 is supplied to the positive input of block 52 as well as to the positive input of a multiplying circuit means 56 and to the negative input of a multiplying circuit means 58. A minus delta X input 60 is supplied to the minus inputs of blocks 52 and 56 and supplied to the plus input of block 58. An output of block 52 is supplied to a summing circuit means 62. An output of block 62 is supplied to one lead of a single pole switch 63 which has a movable contact connected to an input 64 which is grounded. The movable contact of switch 63 is connected to an input of a shift register 66 having its output connected to a theta output 68 and to a second input of summing circuit 62. An output of multiplying block 56 is connected to an input of a summing circuit means 70 and the output thereof is connected to a switch generally designated as 72 and connected in substantially the same manner as switch 63. An output of the switch 72 is connected to an input of sine shift register 74. Register 74 shows 10 leads numbering from 3 to 12 extending vertically therefrom as outputs. A further output 76 is connected to an apparatus output for providing a digital indication of sine theta. This output 76 is connected to a number 2 position in a multiple position switch generally designated as 78 and is also connected to a second input of the summing means 70. The switch 78 and 13 positions of a movable member 80 and it moves consecutively between position 0 and position 12 for each computation and stays at each position for one word time of the frame during the computation. As will be noted, the $T_0$ and the $T_1$ positions are connected to ground. The output of multiplier 58 is connected to a first input of a summing means 82 whose output is connected to a switch generally designated as 75. Switch 75 is connected in much the same manner as switch 72 except a further terminal of this switch is connected to receive a digital input indicative of a normalized version of cosine theta during the $N_0$ word of a frame. As will be noted, switches 63, 72 and 75 are all operated to the position shown during word time $N_0$ and are in the other position during the remaining word times of each frame. The output of switch 75 is connected to an input of a cosine shift register 84. Shift register 84 has a plurality of 10 outputs connected to a rotating switch 86 which is operated in much the same fashion as switch 78. The major distinction is that in switch 86 terminal 2 is connected to ground and terminal 1 is connected to the output of shift register 84 whereas the opposite is true in the connections of switch 78. The output of shift register 84 is also connected to a switch 88 which is open during word time $N_1$ and closed during all remaining word times. The output of switch $N_1$ is further connected to a second input of summing circuit 82. The output of cosine register 84 is designated as 90 and provides a digital indication of cosine theta out from the resolver.

A switch 91 connects an output of switch 78 to a multiplying input of block 58. Likewise, an output of switch 86 is connected through a switch 92 to a multiplying input of block 56. The switches 91 and 92 are simultaneously operated by a signal $\overline{M}$ and are each connected in an alternate position through a J-K flip-flop to an input of a respective word storage means.

FIGS. 4a and 4b comprise a detailed schematic diagram of the circuit illustrated in FIG. 3 and only a few additional details as to operation will be provided. Where applicable, the same blocks are designated with the same numbers. As will be noted, the apparatus of FIG. 4a includes a J-K flip-flop 100 and having an input 102. This flip-flop receives a single input from a device such as the differential amplifier 24 of FIG. 1 and changes it to the required two separate outputs 54 and 60 as illustrated in FIG. 3. A further detail difference is that the switches shown as 63, 72 and 75 in FIG. 3 are incorporated in a different manner through the use of AND gates in FIG. 4a and are operated in a slightly different fashion. The inputs for various ones of the switching signals needed in the circuit are generated by some of the devices shown in FIG. 4b. As illustrated, the generating portion shown as 104 produces the signals M or $\overline{M}$ (not M). The generating portion shown as 106 produces an output indicative of CC to indicate that the 13th word of the frame has expired and thus the converting apparatus will have an output indicative of the answer for the remaining words of the frame. The sync bit or sign bit is used through three one-bit shift registers in generating portion 108 to produce the output for actuating the flip-flop 100 as well as two of the NAND gates. Generator 108 comprises a plurality of one bit shift registers. The generator 106 also produces the output $N_0^{-1}$ which is indicative of the word before $N_0$ and outputs indicative of the remaining words of a frame up to word $N_{13}$ for inserting the proper numbers in generator 110 to be used in the remaining parts of the circuit at the correct time in a frame. The digital numbers generated by generator 110 are illustrated and designated as to words in a frame in block 112. The outputs from number generator 106 are also used in actuating the switches connected to shift registers 74 and 84.

DESCRIPTION OF OPERATION

The CORDIC digital resolver, as referenced briefly supra and any CORDIC type resolver, uses a successive approximation method for resolving angles. Each frame of words an initial angle of substantially 90° is used. This value is then either added to or subtracted from on each of a plurlaity of successive steps to obtain the final resultant angle. plurality of the successive steps is approximately one-half the angle of the previous steps. The initial 90° value must of course be either plus or minus 90° in order to cover the complete 360 electrical degrees possible in the resolution. This information is provided in the referenced IRE Transactions article.

Referring now to FIG. 3, it will be realized that the angles supplied on lead 50 may be those illustrated in block 112 of FIG. 4b from $N_1$ to $N_{12}$. If each input is either positive or negative, the delta theta input on lead 50 will either be added to or subtracted from the previous contents of shift register 66 as shown in the $\Delta\theta$ and Reg 66 columns of FIG. 5. At the end of a frame of words, the digital output supplied on lead 68 and contained within shift register 66 will be a number indicative of the input signals. If 32,768 is used as a base or reference for 180°, 6,000 closely corresponds to 33 units of the 180° or 33°. As will be realized, exactly 33 would correspond to 6,007 units. However, the embodiment illustrated only utilizes 12 word times of a frame to obtain the given accuracy and more accuracy can be obtained by utilizing more word times and longer frames. The input signal are supplied to the respective leads 54 and 60 wherein the plus inputs are those provided on lead 54 and the minus inputs are those provided on lead 60. These same inputs will also produce digital outputs in the sin register corresponding to 27,485 units and in the cos register will provide 17,809 units at the end of the frame. The number in the cos register corresponds almost exactly to the cos of 32.99° while that in the sin register corresponds to 32.92°.

Although the explanation for the operation of the shift register 66 is believed clear from the above description, the operation of the sin and cos registers may still not be clear. During time $T_0$ an input corresponding to the digital number 19,888 is inserted into the shift register 84 through switch 75. This number was chosen to prevent overflow of the resolver. This overflow could occur in calculations of certain angles. Thus, a constant K of 0.60725 was used times the maximum possible number of 32,768 bits to produce a digital number of 19,898. Theoretically, the number 19,898 would not permit overflow, however, a "fudge" factor of an additional 10 digits was used to assure no overflow when the numbers of block 112 are used. These numbers in block 112 are convenient numbers, near the exact numbers, which are easier to generate and are within the required accuracy of the device.

As may be noted, the terms T and N are used interchangeably as to designating word times. The two different letters were used to distinguish between different portions of the circuit.

The constant used to produce the digital number 19,888 is used only once in the calculations. The number 19,888 in the cosine register is then sent to the sine register 74 during time $N_1$. If it is assumed that the angle being calculated is plus 33°, the comparison of the sine and cosine signals will provide an output from amplifier 24 such that a positive input would appear on lead 54. This will keep the number which was originally positive in the register 84 as the same identical positive number during word time $N_1$ in register 74. Since the switch 88 is open during word time $N_1$, the register 84 is cleared. The comparison at the end of word time $N_1$ will change the comparison in the multipliers 22 and 26 and thus change the output of amplifier 24 such that now an input is provided on the negative lead 60 of FIG. 3. Thus, during word time $T_2$ the output from shift register 74 is applied through the switch 78 to the input of multiplying circuit 58 and inserted into the shift register 84. Since the lead 60 is actuated, this number remains positive. The above number also recirculated around the storage or shift register 74 and is reinserted in the shift register 74. Thus, the two shift registers at the end of word time 2 in the frame will have the same numerical values in storage. As will be realized, if the angle being determined were in quadrant II or in other words, a quadrant defined between 90° and 180°, the number in the sine register 74 would be positive while the number in the cosine register 84 would be negative since different inputs would be provided on leads 54 and 60. The comparison at the end of word time $N_2$ will provide an output from amplifier 24 such as with an assumed angle of 33° to provide a further negative input on lead 60 during word time $N_3$. Since the lead 60 is actuated, the number supplied from the cosine shift register is changed to a negative number and thus, the combination reduces the value of the number in sine register 74. On the other hand, a number from the sine register 74 is inserted into the cosine register 84. Since the input is on lead 60, this number is added to the value in register 84.

As may be ascertained from reading the above-referenced Sather patent, the normal mode of operation of the components used in this computer design is least significant bit first. If the taps $T_3$ through $T_{12}$ are connected to successive stages of the shift register, each succeeding lead will effectively have an output which is one-half the value of the word appearing on the next lead to the right. Thus, the word appearing at lead $T_3$ will be one-half the value of that appearing at the output of the shift register. The lead $T_4$ will have one-half the value of $T_3$ or in other words one-fourth the value of the output. Thus, on each successive addition or subtraction of the numbers being supplied from one shift register to the other in accordance with the signals on leads 54 and 60, the amount added or subtracted is half the value previously added or subtracted. This information can be followed on the chart shown in FIG. 5.

In accordance with the above explanation, the column delta theta in FIG. 5 illustrates the numerical value that the column entitled register 66 is increased or decreased for each word in frame. The decision as to whether the number would be increased or decreased is determined by the polarity of the indicator in the input column.

Also in accordance with the above description, the number appearing in the register 74 column for a given word time is the word appearing in the previous word time of that register plus or minus the value appearing in the previous word time in the other register times a fraction corresponding to a given word time. Thus, for word time 4 the number appearing in register 74 is 9,944 plus one-fourth the value appearing in register 84 during word time 3 or in other words, one-fourth of 29,832.

As will be realized by those skilled in the art, the use of successively smaller words obtained by connecting the switches 78 and 86 to consecutive taps on the word storage means 74 and 84 would, if not provided for, considerably alter the value of the words obtained after generation of the desired portion of the word stored. Thus, the output $\overline{M}$ as generated in FIG. 4*b* is used to control switches 91 and 92. On each successive word in a frame the output $\overline{M}$ is generated one bit sooner. The appearance of the signal $\overline{M}$ will change the appropriate switch and supply to the multipliers 56 and 58 a string of zeros if the number stored was negative. Thus, the word outputted to the multipliers from the sin and cos shift registers is truly indicative of succeedingly smaller increments wherein the division factor is increased by an approximate factor of 2 on each successive word.

In summary, the inventive concept as disclosed thus far transforms the three analog outputs obtained from a synchro into two analog outputs through the use of a Scott T connection. These two outputs are indicative of sine and cosine of the angle obtained from the resolver. As is known, the polarities of the sine and cosine signals will be dependent upon the electrical phase quadrant of the resolver and thus ambiguities as to the exact angle are resolved. These analog angle signals are then multiplied times preliminarily assumed angles in digital form in multipliers 22 and 26. As it is illustrated, the sine of the assumed angle is multiplied times the cos of the synchro angle while the cos of the digital assumed angle is multiplied times the sin of the synchro angle. These two products are then compared and utilized to provide a further approximate output in the digital resolver 28. Each step of the resolver 28 covers half the correction angle previously provided. Thus, the output will deviate on both sides of the actual angle in successively smaller steps until the final word time. As illustrated, the present inventive concept calculates for only 13 bits of a 16 word frame, thereby allowing the output to be provided for the final 3 bits of a frame. Thus, there is adequate time to retrieve the output. As will be realized, further accuracy may be obtained by increasing the number of word time calculations in a frame. However, the accuracy of the multipliers 22 and 26 as well as the synchro supplying the signals to the Scott T connection tend to affect further attempts of accuracy in the resolver 28.

Referring now to FIG. 6, it will be apparent from the above description of the operation of FIG. 1 that the application of a constant and predetermined digital value on lead 150 to a multiplier 152 and the application of a constant analog value, the amplitude of which is also predetermined on lead 154 to multiplier 156 will result in a device which converts an analog signal as presented on lead 158 to multiplier 152 to be produced as a digital feedback signal on lead 160 from resolver 162 which is a direct conversion thereof. The outputs of multipliers 152 and 156 are provided to an amplifier 164 and its output is connected to resolver 162 in much the same manner as illustrated in FIG. 1. Further, the multipliers, the comparator and the resolver are designed exactly as illustrated in FIG. 1. Thus, the signals provided to comparator 164 from multiplier 152 are the product of the digital input and the analog voltage input to be converted while the output from multiplier 156 are the product of the predetermined analog voltage and the digital feedback voltage. Thus, the digital output on lead 160 from resolver 162 will be an initial approximate answer which after each comparison during the frame will continue to approach a value which will tend to be converted so as to be substantially identical in indicated digital value as the analog input at the end of the word frame.

As may be seen in the above, the present inventive concept is not limited to converting trigonometric functions from analog to digital but may be used in a wide variety of analog to digital conversions without redesign of any circuitry.

While two specific preferred embodiments have been illustrated, I wish to be limited not by the disclosure provided, but rather by the scope of the appended claims, wherein,

I claim:

1. Converting apparatus comprising, in combination:
first and second signal supplying means for supplying analog signals indicative respectively of sine and cosine to be converted to a digital indication where $\alpha$ is an angle the trigonometric functions of which are to be converted;
first multiplying means including first and second inputs and an output;
means connecting said first signal supplying means to said first input of said first multiplying means;
second multiplying means including first and second inputs and an output;
means connecting said second signal supplying means to said first input of said second multiplying means;
comparator means, including input and output means, connected to receive signals from said outputs of said first and second multiplying means, said comparator means providing an analog output indicative of which of said first and second multiplying means is supplying the largest magnitude output;
CORDIC type resolver means, including input means and first and second output means, said resolver means supplying outputs of sin $\theta$ and cos $\theta$ at said first and second output means respectively, wherein the values of the signals at said outputs thereof change as a function of signals supplied to the input thereof and $\theta$ is an approximation of the angle $\alpha$, said resolver operating over a predetermined plurality of digital word times comprising a frame of words, the cofunction sin and cos digital output signals changing on each succeeding word of a frame as a function of the polarity of the signal received from the comparator means, as a function of the word time in a frame and as a function of the value of the cofunction digital output signal in the preceding word time;
means connecting said output means of said comparator means to said input means of said resolver means;
means connecting said first output means of said resolver means to said second input of said first multiplying means; and
means connecting second output means of said resolver means to said second input of said second multiplying means.

2. Converting apparatus as claimed in claim 1 wherein said resolver comprises:
first, second and third multiplying means each including signal input means, signal output means and first and second control input means;
means for supplying a series of digital words to said signal input means of said first multiplying means wherein the magnitude of the words consecutively decrease during the period of a frame of words;
first, second and third summing means each including first and second input means and each including output means;
means connecting the output of said first multiplying means to said first input of said first summing means;
first, second and third word storage means each including input means and output means, said word storage means storing the bits of a word to be outputted with the least significant bit of a word being outputted first;
means connecting said first word storage means between said output of said first summing means and said second input of said first summing means;
apparatus output means connected to said output of said first word storage means for providing a digital output signal indicative of the angle of a signal being generated;

first and second switching means each including a plurality of inputs and a single output;

means connecting the output of said second switch means to said signal input of said second multiplying means;

means connecting the output of said second multiplying means to said first input of said second summing means;

means connecting said second word storage means between said output of said second summing means and said second input of said second summing means;

means connecting inputs of said first switch means to said second word storage means such that each input thereof receives a digital word of decreased absolute value from said word storage means as compared to that received by a previous input of said first switch means;

second apparatus output means connected to said output of said second word storage means for providing a digital output signal indicative of the sine of the angle being generated;

means connecting the output of said first switch means to said signal input of said third multiplying means;

means connecting the output of said third multiplying means to said first input of said third summing means;

means connecting said third word storage means between said output of said third summing means and said second input of said third summing means;

means for inserting a predetermined word value into the said third word storage means during the first word of a frame of words;

means for connecting a plurality of inputs of said second switch means to said third word storage means such that successive inputs thereof receive digital words of decreased absolute value from said word storage means as compared to that received by a previous input to said second switch means;

third apparatus output means connected to said output of said third word storage means for providing an output indicative of the cosine of the angle generated; and means for supplying control signals to said first and second control inputs of said first, second and third multiplying means.

3. Digital apparatus operating over a plurality of words constituting a frame of words comprising, in combination:

first, second and third multiplying means each including signal input means, signal output means and first and second control input means;

means for supplying a series of digital words to said signal input means of said first multiplying means wherein the magnitude of the words consecutively decrease during the period of a frame of words;

first, second and third summing means each including first and second input means and each including output means;

means connecting the output of said first multiplying means to said first input of said first summing means;

first, second and third word storage means each including input means and output means, said word storage means storing the bits of a word to be outputted with the least significant bit of a word being outputted first;

means connecting said first word storage means between said output of said first summing means and said second input of said first summing means;

apparatus output means connected to said output of said first word storage means for providing a digital output signal indicative of the angle of a signal being generated;

first and second switching means each including a plurality of inputs and a single output;

means connecting the output of said second switch means to said signal input of said second multiplying means;

means connecting the output of said second multiplying means to said first input of said second summing means;

means connecting said second word storage means between said output of said second summing means and said second input of said second summing means;

means connecting inputs of said first switch means to said second word storage means such that each input thereof receives a digital word of decreased absolute value from said word storage means as compared to that received by a previous input of said first switch means;

second apparatus output means connected to said output of said second word storage means for providing a digital output signal indicative of the sine of the angle being generated;

means connecting the output of said first switch means to said signal input of said third multiplying means;

means connecting the output of said third multiplying means to said first input of said third summing means;

means connecting said third word storage means between said output of said third summing means and said second input of said third summing means;

means for inserting a predetermined word value into the said third word storage means during the first word of a frame of words;

means for connecting a plurality of inputs of said second switch means to said third word storage means such that successive inputs thereof receive digital words of decreased absolute value from said word storage means as compared to that received by a previous input to said second switch means;

third apparatus output means connected to said output of said third word storage means for providing an output indicative of the cosine of the angle being generated; and means for supplying control signals to said first and second control inputs of said first, second and third multiplying means.

4. Apparatus as claimed in claim 3 wherein:

said means for supplying control signals comprise first and second leads wherein the first lead is connected to said first control means of said first and second multiplying means and to said second control means of said third multiplying means; and said second lead is connected to said input of said first and second multiplying means and connected to said first input of said third multiplying means.

* * * * *